Aug. 22, 1961     J. W. TAYLOR, JR., ET AL     2,997,601
DELAYED PULSE GENERATOR WITH EXPONENTIALLY
FUNCTIONING VOLTAGE COINCIDENCE TIMER
Filed Aug. 13, 1957     2 Sheets-Sheet 1

WITNESSES:

INVENTORS
John W. Taylor, Jr. and
Ralph E. Reise
BY
ATTORNEY

Aug. 22, 1961 J. W. TAYLOR, JR., ET AL 2,997,601
DELAYED PULSE GENERATOR WITH EXPONENTIALLY
FUNCTIONING VOLTAGE COINCIDENCE TIMER
Filed Aug. 13, 1957 2 Sheets-Sheet 2

United States Patent Office 2,997,601
Patented Aug. 22, 1961

2,997,601
DELAYED PULSE GENERATOR WITH EXPONENTIALLY FUNCTIONING VOLTAGE COINCIDENCE TIMER
John W. Taylor, Jr., Baltimore, and Ralph E. Reise, Glen Burnie, Md., assignors to Westinghouse Electric Corporation, East Pittsburgh, Pa., a corporation of Pennsylvania
Filed Aug. 13, 1957, Ser. No. 677,874
6 Claims. (Cl. 307—88.5)

This invention relates to time modulation systems for the identification of an instant of time that follows a reference instant of time by a controllable time interval, and more particularly to systems which provide an output voltage pulse that follows a reference voltage pulse by a time interval which is a function of an input control variable.

One application of such systems occurs in radar range indicator apparatus in which a mechanical dial indicator means is provided to indicate the range of any selected target when the time of occurrence of a time modulated marker pulse is adjusted to coincide with a target echo pulse on a target display device.

It is to be understood that the invention may also find utility in other apparatus such as for example automatic range tracking circuits of radar systems, various analogue computer systems, and virtually any situation where it is necessary to provide a second pulse following a first pulse by a variable time interval.

Time modulators for the identification of an instant of time that follows a reference instant of time by a controllable time interval have been provided in the past in various forms. One such system is the boot strap triangle generator type usually including a gate generator, a triangle generator, a linear potentiometer, and a comparator circuit. An example of that system is described in detail in the MIT Radiation Laboratories Series, volume 20, pages 125 to 130. Such prior circuits, while producing generally satisfactory results, have been relatively complex, unreliable, expensive to manufacture and have added appreciably to the weight and size of the equipment in which they are employed.

Accordingly, it is a principal object of this invention to provide a more reliable and simplified time measuring system.

Another object of the invention is to provide a time modulator system of the sawtooth waveform voltage type utilizing circuits comprising semiconductor devices as the active circuit elements.

A further object of the invention is to provide an improved time modulator in which a voltage increasing exponentially with time is compared with an exponentially controllable direct current voltage to produce an output pulse following a reference pulse by an interval of time which is linearly proportional to an applied control variable.

An additional object of the invention is to provide an improved time modulator in which the direct current comparator control voltage is exponentially proportional to an applied control variable and is generated by a circuit including a substantially linear potentiometer.

It is a different object of the invention to provide a range strobe system for radar indicator apparatus which may be manually controlled to present a movable range marker spot on the indicator screen and which utilizes a time modulator system including an exponential sawtooth waveform generator and a time interval control voltage generator for providing a variable direct current control voltage which is exponentially related to the angular position of a shaft for inserting a time interval control variable.

Briefly, the foregoing and other objects are accomplished by means of a time modulated system utilizing an exponential sawtooth waveform generator. The sawtooth generator operates in response to a reference pulse having a predetermined time of occurrence and provides a timing voltage increasing exponentially with time. The sawtooth waveform voltage is compared in a conventional amplitude comparator circuit with an adjustable direct current control voltage. A time delayed output pulse is produced by the comparator when the saw-tooth voltage becomes equal to the control voltage. By providing an accurately calibrated potentiometer for adjusting the control voltage, the time between the reference pulse and the output pulse may be adjusted to any desired accurately predeterminable time interval. The calibrated variable time interval ($t$) may be utilized in various known ways to measure an unknown time interval. For example, one application of the time modulator of the present invention is in radar range measuring systems where the time interval between a transmitted radar pulse and a target echo pulse may be measured by synchronizing the reference pulse with the transmitted radar pulse and adjusting the control potentiometer to cause visual coincidence of the target echo pulse with the time delayed modulator output pulse on the face of a cathode ray tube. A dial or counter mechanism mechanically coupled to the potentiometer shaft is utilized to indicate the time interval (or the corresponding distance of the particular target) between the reference pulse and the echo pulse. The dial or counter mechanism commonly used in such radar range indicators provides a linear proportionality between the dial reading and the angular position ($\theta$) of the potentiometer control shaft. Since it is desired to provide a linear proportionality between the dial or counter reading and the variable time interval ($t$), it follows that the circuits used must be such that ($t$) is varied linearly as a function of ($\theta$).

In prior systems the linear relation between ($\theta$) and ($t$) has been obtained by comparing a linear sawtooth or triangular waveform with a control voltage which is linearly proportional to ($\theta$).

The present invention contemplates a time measuring system utilizing semiconductor devices as the active circuit elements. No semiconductor circuits for generating linear triangle waveforms of sufficient accuracy are readily available. The conventional circuits for generating linear sawtooth waveforms are the Phantastron and the so-called boot strap triangle generator. The Phantastron circuit employs a pentode, and hence cannot be replaced by an equivalent circuit utilizing semiconductor devices. The linearity of the conventional boot strap generator is dependent on the use of an amplifier device having near unity voltage gain and nearly infinite power gain. Those characteristics of the conventional cathode follower are not obtainable in the equivalent grounded collector transistor amplifier. The non-linearity produced by the limited power gain of a transistor grounded collector stage prohibits using a transistorized boot strap as a triangle generator in the conventional types of time modulators.

The advantages of the present invention reside in the derivation of a linear time interval ($t$) by utilizing a non-linear or exponential sawtooth waveform voltage instead of the usual triangular waveform.

Other objects and advantages of the invention will be apparent from the following description taken in accordance with the accompanying drawing, throughout which like reference characters indicate like parts, which drawing forms a part of this application and in which.

Figure 1:
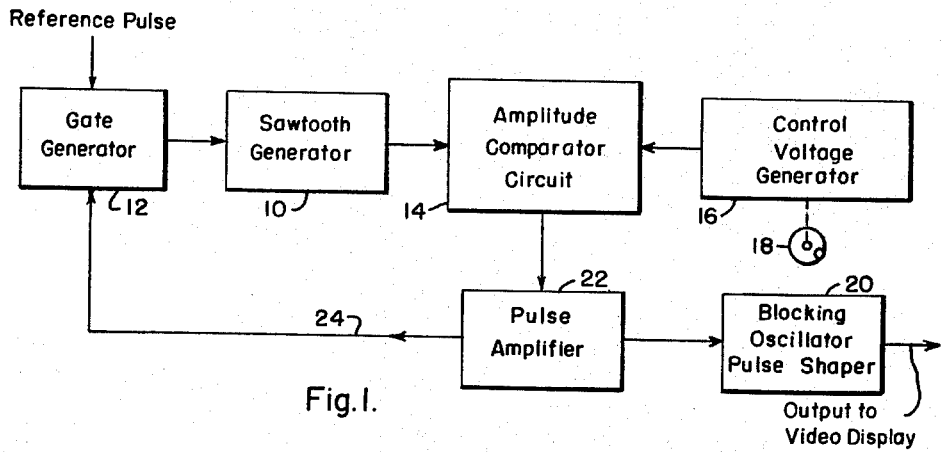
FIGURE 1 is a block diagram of a time modulator apparatus in accordance with the present invention.

Now referring to FIG. 1, there is shown a conventional gate generator 12 which receives an input reference pulse having a predetermined time of occurrence. The gate generator produces a negative output gate voltage having a time duration equal to or longer than the longest time to be measured with the apparatus. The negative gate pulse is applied to the input of a sawtooth generator 10 which generates a negative exponential sawtooth voltage. The sawtooth voltage waveform generator 10 is applied to the input of an amplitude comparator circuit 14. Also applied to the amplitude comparator circuit is a controllable direct current voltage from a control voltage generator 16 which may comprise a potentiometer having a dial or counter mechanism of a conventional type and having a knob or crank 18 for adjusting the magnitude of the control voltage applied to the amplitude comparator circuit.

The amplitude comparator circuit operates to provide an output pulse at a time when the sawtooth waveform voltage reaches a magnitude equal to the direct current control voltage. The output pulse from the amplitude comparator circuit 14 is applied to a pulse amplifier 22. The pulse amplifier 22 sharpens the output pulse and applies it to a blocking oscillator pulse shaping circuit 20. A second output from the pulse amplifier circuit 22 is applied over a conductor 24 to the gate generator 12 to terminate the negative gate voltage and thereby condition the gate generator and the sawtooth generator for reception of successive reference pulses. The output from the blocking oscillator pulse shaping circuit 20 may be applied to a video display device, such as a cathode ray tube, in accordance with practices which are well known in the art.

Figure 2:
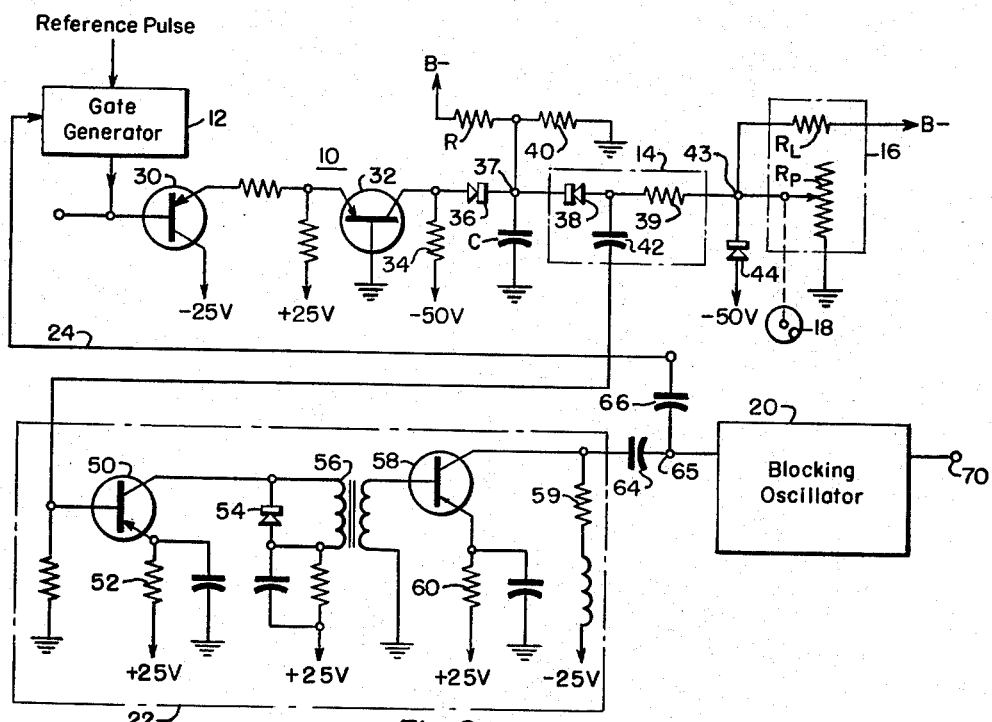
FIG. 2 is a detailed schematic diagram of the apparatus of FIG. 1.

As best seen in FIG. 2, the sawtooth generator 10 includes a grounded collector transistor stage 30 having its output connected to the emitter of a grounded base transistor 32. The collector electrode of the grounded base transistor 32 is connected to a clamping diode 36 and to a negative voltage source through a current limiting resistor 34. The emitter electrodes of transistors 30 and 32 are connected to a biasing voltage source in accordance with conventional practice. The sawtooth generator further includes a capacitor C connected between ground and the clamping diode 36. The junction point 37 between the capacitor C and the diode 36 is further connected to a voltage divider comprising a fixed resistor R and a resistor 40. The resistor R and the resistor 40 are serially connected between a negative voltage source B— and ground. The terminal 37 is the point at which the exponential sawtooth waveform generated across the capacitor C appears and is applied to the input of the amplitude comparator circuit 14. The amplitude comparator circuit 14 includes a semiconductor diode 38, a resistor 39 and a capacitor 42. The diode 38 and the resistor 39 are serially connected between the input terminal 37 and an input terminal 43. The capacitor 42 is connected from the junction point of diode 38 and resistor 39 to the input circuit of the pulse amplifier 22.

The direct current control voltage generator 16 comprises a resistance $R_L$, a variable potentiometer resistance $R_P$, the hand crank or knob 18 for adjusting the potentiometer $R_P$ and an indicating dial or counter (not shown). The fixed resistor $R_L$ is connected between the terminal 43 which is the output terminal of the control voltage generator 16 and a negative voltage source B—. The variable resistor $R_P$ is connected between the terminal 43 and ground. Thus, the resistor $R_L$ and the potentiometer type resistor $R_P$ comprise a voltage divider connected between the negative voltage source B— and ground and provide a variable direct current voltage to the terminal 43 and to the second input of the amplitude comparator circuit 14.

The pulse amplifier 22 comprises a first grounded emitter transistor stage 50 and a second grounded emitter transistor stage 58. The collector electrode of the first stage 50 is connected to the primary of a coupling transformer 56. The secondary of the coupling transformer 56 is connected to the base electrode of the second stage 58. The emitter electrodes of transistors 50 and 58 are serially connected to positive biasing voltage sources in the conventional manner. The coupling transformer 56 has a 5 to 1 turns ratio and is connected step-down so as to obtain maximum driving current for the second stage 58. The output of the pulse amplifier 22 is taken from the collector electrode of the second stage 58, which electrode is connected to a negative biasing voltage through a load resistor 59. A capacitor 64 is provided for coupling the output of the second stage 58 to a terminal 65. The terminal 65 is the input terminal to the blocking oscillator circuit 20. The blocking oscillator circuit 20 may be any well-known blocking oscillator, preferably of the transistor type. Since such blocking oscillators are well known in the art, per se, a detailed description thereof is dispensed with. The input terminal 65 is further connected through a capacitor 66, to a conductor 24, so as to apply the amplified pulse output from the pulse amplifier 22 to the gate generator 12. The purpose of this feedback from the pulse amplifier 22 to the gate generator 12 is to terminate operation of the gate generator 12 as soon as the sawtooth voltage across capacitor C has performed its function of providing an accurately timed output from the comparator 14.

The operation of the apparatus of FIG. 2 is substantially as follows. A reference pulse having a predetermined time of occurrence is applied to the gate generator 12. The conventional gate generator 12 produces a negative output voltage pulse having a sharp leading edge and having a comparatively long time duration. Prior to application of an input gating pulse, the grounded base transistor stage 32 is conducting heavily so as to maintain a large forward current flow through the clamping diode 36, thereby maintaining the terminal 37 at substantially ground potential. Thus, the diode 36 operates in response to transistor 32 to act as a clamping circuit prohibiting the build up of any voltage across the capacitor C prior to the initiation of an input gate. When the negative gate is applied to the base of transistor 30, the transistor 30 conducts heavily, thereby driving the emitter electrode of transistor 32 negative so that transistor 32 is sharply cut off. When transistor 32 ceases to conduct, its collector electrode goes negative, thereby biasing the diode 36 in the reverse direction so that diode 36 effectively constitutes an open circuit from terminal 37 to ground. As soon as diode 36 ceases to conduct, capacitor C begins to charge exponentially through resistor R.

The exponential voltage rise across capacitor C is applied to comparator diode 38. Diode 38 is normally biased in the reverse direction so as to be non-conducting, and will conduct only when the input exponential waveform at terminal 37 reaches a magnitude greater than the steady state control voltage applied to the comparator diode 38 through resistor 39. As soon as the exponentially increasing voltage at terminal 37 reaches a magnitude greater than the controllable reference voltage, current will flow in the forward direction through diode 38, thereby generating a positive pulse across the resistor 39. The time modulated positive pulse is applied through capacitor 42 to the input of pulse amplifier 22. The pulse applied to the input of first stage 50 causes it to conduct more heavily, thereby applying maximum driving current to the base electrode of the second stage 58 through the transformer 56. The second stage 58 is thus driven to saturation very rapidly giving the leading edge of the output pulse appearing at terminal 65 a very fast rise time.

The pulse from amplifier 22 is applied through the capacitor 66 to terminate the negative gating pulse, thereby causing the grounded base transistor 32 to again conduct heavily so that capacitor C is again effectively shorted or clamped to ground potential. The result is that the pulse applied to the input of the blocking oscillator 20 is a short duration trigger pulse. The blocking oscillator 20 operates in response to that time modulated short duration trigger pulse to provide an output pulse at the output terminal 70 which is a standard pulse shape and magnitude and which may be utilized in any apparatus requiring a voltage pulse that follows a reference pulse by time interval which is a linear function of an input control variable.

Since the sawtooth voltage provided by generator 10 is an exponential function of time, it is necessary that the controllable direct current voltage output from generator 16 shall be a similar exponential function of the potentiometer shaft rotation ($\theta$) or the dial or counter time indication (T). Adherence to that requirement assure that the time interval ($t$) between the reference pulse and the output pulse will be a linear function of the shaft rotation ($\theta$) and hence a linear function of the dial indication (T).

The foregoing exponential relation between the control shaft position ($\theta$) and the control voltage $E_2$ is achieved by selecting resistance values $R_L$ and $R_P$ such that the voltage appearing across the potentiometer $R_P$ varies exponentially as a function of control shaft rotation ($\theta$) and such that the control voltage function has a curvature closely approximating the curvature of the sawtooth waveform from generator 10. The proper circuit parameters to attain the desired exponential relationship between the shaft rotation ($\theta$) and the direct current control voltage $E_2$ are determinable by the following analysis.

*Analysis of control voltage generator*

As seen in FIGURE 2, the control voltage generator 16 comprises a source of direct current voltage B— and a voltage divider network including resistor $R_L$ and potentiometer $R_P$ connected in series between the source B— and ground. The potentiometer $R_P$ has a control knob 18 coupled mechanically to the shaft thereof and preferably has a conventional counter or dial indicator (not shown) mechanically coupled to the control knob 18 to indicate angular position of the potentiometer control shaft.

Figure 3:
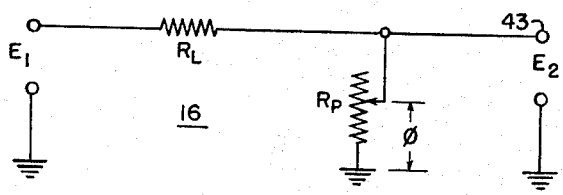
FIGS. 3 and 4 are equivalent circuit diagrams of selected portions of FIG. 2 provided to facilitate analysis of those circuit portions.

Referring to FIG. 3, the direct current control voltage generator 16 is shown alone for clarity of analysis. $E_1$ represents the source of D.C. voltage B—, and $E_2$ represents the adjustable control voltage which is applied to the comparator circuit 14 at terminal 43. The exponential characteristic of $E_2$ as a function of shaft rotation $\theta$ can be analyzed as follows.

From FIGURE 3:

(1) $$\frac{E_2}{E_1} = \frac{R_P}{R_P + R_L}, \text{ and } R_P = K\theta$$

(2) $$\frac{E_2}{E_1} = \frac{K\theta}{R_L + K\theta}$$

(3) $$\frac{E_2}{E_1} = \frac{\frac{K\theta}{R_L}}{1 + \frac{K\theta}{R_L}} = \frac{K\theta}{R_L}\left(\frac{1}{1 + \frac{K\theta}{R_L}}\right)$$

(4) $$\frac{E_2}{E_1} = \frac{K\theta}{R_L}\left[1 - \frac{K\theta}{R_L} + \left(\frac{K\theta}{R_L}\right)^2 - \left(\frac{K\theta}{R_L}\right)^3 + \ldots\right]$$

By inspection of Equation 4 above it is readily apparent that $$\frac{K\theta}{R_L}$$

constitutes a linear factor contributing to the characteristic of $E_2$ as a function of $\theta$. Similarly the quantity expressed in brackets in Equation 4 is the factor contributing non-linearity to $E_2$.

The percentage by which $E_2$ varies from linearity for all values of $\theta$ is the amount by which the factor in brackets differs from unity. The percentage of non-linearity in $E_2$ may be conveniently designated as:

(5) $$\epsilon_\theta = \frac{K\theta}{R_L} - \left(\frac{K\theta}{R_L}\right)^2 + \left(\frac{K\theta}{R_L}\right)^3 - \left(\frac{K\theta}{R_L}\right)^4 + \ldots$$

In order to clearly show that the characteristic curve of the control voltage $E_2$ is similar to the exponential characteristic of the voltage waveform produced by generator 10, an analysis of the sawtooth generator is necessary.

*Analysis of sawtooth generator*

Figure 4:
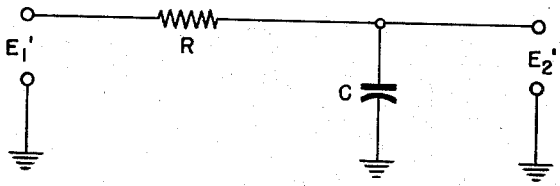

During the time period when transistor 32 is cut off, the diode 36 is biased in the reverse direction and presents an extremely high impedance across capacitor C. Under those conditions the sawtooth generator may be represented by the equivalent circuit shown in FIG. 4. The direct current voltage source B— is represented by $E_1'$. The sawtooth waveform voltage which is applied to comparator circuit 14 from capacitor C is represented by $E_2'$. The exponential characteristic of $E_2'$ as a function of time can be expressed and analyzed as follows:

(6) $$E_2' = E_1'(1 - e^{-t/RC})$$

and by classical expansion:

(7) $$e^{-t/RC} = 1 - \frac{t}{RC} + \frac{1}{2!}\left(\frac{t}{RC}\right)^2 - \frac{1}{3!}\left(\frac{t}{RC}\right)^3 + \ldots$$

therefore:

$$\frac{E_2'}{E_1'} = \frac{t}{RC} - \frac{1}{2!}\left(\frac{t}{RC}\right)^2 + \frac{1}{3!}\left(\frac{t}{RC}\right)^3 - \ldots$$

(8) $$\frac{E_2'}{E_1'} = t/RC\left[1 - \frac{t}{2!RC} + \frac{1}{3!}\left(\frac{t}{RC}\right)^2 - \frac{1}{4!}\left(\frac{t}{RC}\right)^3 + \ldots\right]$$

By inspection of Equation 8 it is clear that $$\frac{t}{RC}$$

constitutes a linear factor contributing to the value of $E_2'$ as a function of time. Similarly the quantity expressed in brackets in Equation 8 constitutes the non-linear factor contributing to the value of $E_2'$.

The percentage by which $E_2'$ varies from a linear sawtooth or triangle waveform for all time intervals may be expressed as the amount by which the factor in brackets differs from unity. Hence:

Percent non-linearity = $\epsilon_t$ (9) $$\epsilon_t = \frac{t}{2!RC} - \frac{1}{3!}\left(\frac{t}{RC}\right)^2 + \frac{1}{4!}\left(\frac{t}{RC}\right)^3 - \frac{1}{5!}\left(\frac{t}{RC}\right)^4 + \ldots$$

For the dial or counter 18 to indicate accurately the actual time between the reference pulse and the output pulse from comparator 14, it is essential that $E_2'$ equals $E_2$ at the instant when the actual charging time $t$ becomes equal to the selected time T as indicated by the dial or counter. The above requirement may be expressed when $t = T$, $E_2' = E_2$.

From inspection of Equation 4 and Equation 8, it may be seen that $E_2'$ can be made very nearly equivalent to $E_2$ if:

(10) $$\frac{K\theta}{R_L} = \frac{T}{2RC}, \text{ and if } E_1 = 2E_1'$$

The result desired is to have $E_2 = E_2'$ for all values of $t = T$. Therefore, setting $E_2 = E_2'$ and substituting the conditions of Equation 10 into Equations 4 and 8 gives the following relation between actual time $t$ and dial time $T$:

(13)
$$\frac{T}{2RC}\left[1-\frac{T}{2RC}+\left(\frac{T}{2RC}\right)^2-\left(\frac{T}{2RC}\right)^3+\left(\frac{T}{2RC}\right)^4-\ldots\right]$$

$$=\frac{t}{2RC}\left[1-\frac{t}{2RC}+\frac{1}{3!}\left(\frac{t}{RC}\right)^2-\frac{1}{4!}\left(\frac{t}{RC}\right)^3+\ldots\right]$$

(14)
Actual time $t$
$$=T\frac{\left[1-\frac{T}{2RC}+\frac{1}{4}\left(\frac{T}{RC}\right)^2-\frac{1}{8}\left(\frac{T}{RC}\right)^3+\frac{1}{16}\left(\frac{T}{RC}\right)^4\ldots\right]}{\left[1-\frac{t}{2RC}+\frac{1}{6}\left(\frac{t}{RC}\right)^2-\frac{1}{24}\left(\frac{t}{RC}\right)^3+\ldots\right]}$$

or

(15) $\quad t=T\frac{(1-\epsilon_\theta)}{1-\epsilon_t}=T\left[1-\frac{\epsilon_\theta-\epsilon_t}{1-\epsilon_t}\right]$ The error in any given time measurement will be the amount by which actual time $t$ deviates from dial indicated time $T$. From inspection of Equation 15 it is apparent that, for any value of $T$, actual time $t$ will differ from $T$ by an amount:

$$\text{Error in } T=\left(\frac{\epsilon_\theta-\epsilon_t}{1-\epsilon_t}\right)T$$

(16) $\quad$ Percentage error $\epsilon=\frac{\text{Error in } T}{T}=\frac{\epsilon_\theta-\epsilon_t}{1-\epsilon_t}$ The percentage error $\epsilon$ is the percentage deviation between the exponential voltage $E_2'$ and the control voltage $E_2$ from generator 16.

To determine the circuit parameters necessary to maintain $\epsilon$ within permissible or negligible limits, the values of $\epsilon_\theta$ (Equation 5) and $\epsilon_t$ (Equation 9) and $$\frac{K\theta}{R_L}$$

(Equation 10) may be substituted in Equation 16:

(17)
$$\epsilon=\frac{\left(\frac{T}{2RC}-\frac{t}{2RC}\right)-\left[\frac{1}{4}\left(\frac{T}{RC}\right)^2-\frac{1}{6}\left(\frac{t}{RC}\right)^2\right]+\left[\frac{1}{8}\left(\frac{T}{RC}\right)^3-\frac{1}{24}\left(\frac{t}{RC}\right)^3\right]+\ldots}{1-\frac{t}{2RC}+\frac{1}{6}\left(\frac{t}{RC}\right)^2-\frac{1}{24}\left(\frac{t}{RC}\right)^3+\frac{1}{120}\left(\frac{t}{RC}\right)^4-\ldots}$$

Equation 17 can be solved by successive approximation only.

If a value of 0.2 is arbitrarily selected for $$\frac{t}{2RC}$$

and intially assuming that $$\frac{T}{2RC}$$

and has the same value, substitution in Equation 17 gives a value:

$$\epsilon=\frac{.00908}{.8242}=.0111=1.11\%$$

Repeated calculations to obtain a more accurate result indicate $\epsilon$ to be 1.33%. This means that $E_2$ deviates from $E_2'$ by 1.33% at a particular arbitrarily selected time, $t=0.4RC$.

The percentage deviation from linearity $\epsilon_t$ of the capacitor $C$ charging curve can be determined at the point $t=0.4RC$ by substitution in Equation 9.

$$\epsilon_t=\frac{0.4}{2!}-\frac{1}{3!}(0.4)^2+\frac{1}{4!}(0.4)^3-\frac{1}{5!}(0.4)^4+\ldots$$

$$\epsilon_t=0.2-0.0267+0.00213-0.0002$$

$$\epsilon_t=0.1752 \text{ or } 17.52\% \text{ non-linearity}$$

Figure 5:
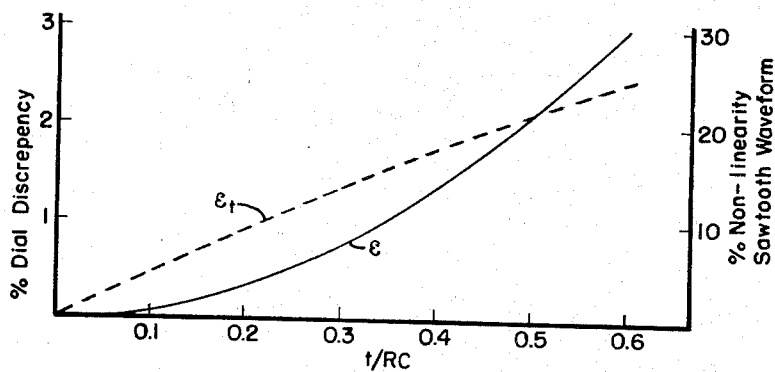
FIG. 5 is a graphical representation illustrating the percentage deviation from linearity of the time interval ($t$) for various dial indicator settings (T).

FIGURE 5 shows $\epsilon$ (percent dial discrepancy) and $\epsilon_t$ (percent non-linearity of $E_2'$) as functions of $t/RC$ for all values of $t/RC$ ranging from zero to 0.6. FIG. 5 clearly illustrates the percentage error between the dial setting $T$ and the actual time $t$ at which the output pulse is generated in a system conforming to the conditions of Equation 10.

It is to be understood that the present invention is not limited to systems having parameters conforming to Equation 10. By variation of the parameters of FIG. 2, various modifications having different curves of $\epsilon$ as a function of $t/RC$ can be achieved. For example, the curve $\epsilon$ as shown in FIG. 5 can be shifted down to give a negative for some values of $t/RC$ and a positive $\epsilon$ for other values.

Elimination of the usual requirement that the timing waveform be linear greatly simplifies the sawtooth generator circuitry and makes possible an accurate transistor time modulator.

The manner of application of the delayed voltage pulse in conjunction with the echo pulse in a pulse echo distance measuring system forms no part of the present invention, but is known per se, and description thereof accordingly is dispensed with herein.

While the present invention has been described as it may be applied to a radar range indicator, it is to be understood that it is not so limited but may find utility in any situation requiring provision of an electronic index, such as a voltage pulse, which follows a reference pulse by an accurately controllable time interval.

The present invention has been disclosed in one form only; however, it will be obvious to those skilled in the art that it is not so limited but is susceptible of various changes and modifications without departing from the spirit and scope thereof.

We claim as our invention:

1. A delayed pulse generator comprising, a source of reference pulses, an exponential sawtooth voltage waveform generator, means to gate said generator in response to said reference pulses, a linear potentiometer having a control shaft, a shaft position indicator device, a comparator circuit, a pulse amplifier, means for applying said saw-tooth generator output to said comparator circuit, means for coupling said comparator circuit output to said pulse amplifier, means for taking a portion of said pulse amplifier output as a time delayed pulse, means to apply a direct current to said potentiometer, said latter means including an impedance having a magnitude such that the direct current voltage across said potentiometer approximates an exponential function of the angular position of said shaft, and means for coupling said direct current voltage to said comparator circuit.

2. A time-modulation circuit for generating a variably delayed voltage pulse which corresponds in time to the angular position of a control shaft, said circuit comprising, means for generating a reference gate signal having a predetermined time of occurrence, an electronic switch means having an input terminal and an output terminal, means for coupling the output of said gate signal generating means to said input terminal to control said switch means, a comparator circuit including a unilaterally conductive device and a source of biasing potential, a capacitor connected between said output terminal and a point of reference potential, means connecting said output terminal to said comparator circuit, a source of charging current, a resistance connected between said source of charging current and said capacitor to charge the latter when said switch is open so as to generate an exponential sawtooth waveform voltage across said capacitor, adjustment means for said source of biasing potential including a substantially linear potentiometer and a direct current source connected thereto with the impedance of said current source being such that the voltage across said potentiometer is an exponential function of the angular position of said control shaft, said exponential function closely approximating the exponential characteristic of said sawtooth waveform voltage as a function of time.

3. In a radar range indicator system of the type employing a range marker pulse, a time modulator for delaying the marker pulse comprising a source of gating pulses having predetermined times of occurrence, an exponential sawtooth waveform generator including in series connection a capacitor, a resistor and a source of direct current voltage, clamping means for normally clamping the voltage across said capacitor at a predetermined level, electronic switch means connected between said source of gating pulses and said clamping means to unclamp said clamping means during said gating pulses, a source of control voltage, and an amplitude comparator circuit connected between said capacitor and said source of control voltage to produce a time delayed output pulse at the time when said capacitor voltage equals said control voltage, said source of control voltage including a linear potentiometer having a control shaft, a resistor connected to said potentiometer and a source of direct current connected to said potentiometer and said resistor in series to produce a voltage across said potentiometer which varies substantially as an exponential function of the angular position of said control shaft.

4. A time-modulation circuit for generating a second voltage pulse which follows a first voltage pulse by a controllable interval of time comprising a comparator circuit having first and second terminals, means for producing a sawtooth voltage synchronized with said first pulse and varying exponentially with time, means to apply said sawtooth voltage between a point of reference potential and the first terminal of said comparator circuit, range voltage generator means including a linear potentiometer having a control shaft and a source of current connected to said potentiometer for generating a range voltage thereacross which varies exponentially with the angular position of said control shaft, means for applying said range voltage between said point of reference potential and the second terminal of said comparator circuit, so that said comparator circuit conducts to produce said second voltage pulse at the time when said sawtooth equals said range voltage.

5. In combination, an exponential sawtooth voltage generator, means for synchronizing said sawtooth voltage with a reference instant of time, a substantially linear potentiometer having a control shaft, a resistor, a source of current connected across said potentiometer and said resistor in series to generate a variable control voltage across said potentiometer, said resistor and said potentiometer having relative resistance magnitudes such that said variable control voltage is a substantially exponential function of the angular position of said control shaft, an amplitude comparator circuit, circuit means for applying said sawtooth voltage and said variable control voltage in serial opposition across said amplitude comparator circuit so that said comparator circuit conducts only when said sawtooth voltage exceeds said control voltage, and means connected to said amplitude comparator circuit for taking the output of said comparator circuit as a time delayed pulse, the exponential function of said sawtooth voltage and the exponential function of said control voltage having substantially similar exponential curves such that said time delayed pulse follows said reference instant of time by a time interval which is a linear function of the angular position of said control shaft.

6. A time modulation system for the identification of an instant of time that follows a reference instant of time by a controllable time interval, comprising means for producing a sawtooth voltage waveform synchronized with said reference instant of time and increasing as an exponential function of time, control voltage generator means including a variable impedance means having a control shaft and a source of current connected to said impedance means to generate a time interval control voltage which increases as an exponential function of the angular rotation of said control shaft, an amplitude comparator circuit having first and second terminals, means for applying the algebraic sum of said sawtooth voltage and said control voltage between said first and second terminals so that said comparator circuit conducts only when said sawtooth voltage exceeds said control voltage, and means connected to said second terminal for taking the output of said comparator circuit as a time-modulated pulse which follows said reference instant of time by a time interval substantially proportional to the angular rotation of said control shaft.

References Cited in the file of this patent

UNITED STATES PATENTS

| | | |
|---|---|---|
| 2,589,085 | Houghton | Mar. 11, 1952 |
| 2,651,022 | Shelley | Sept. 1, 1953 |
| 2,658,141 | Kurland et al. | Nov. 3, 1953 |